April 23, 1946.   J. W. QUINN   2,399,141
WATER AUTOMOBILE
Filed Sept. 13, 1944   4 Sheets-Sheet 2

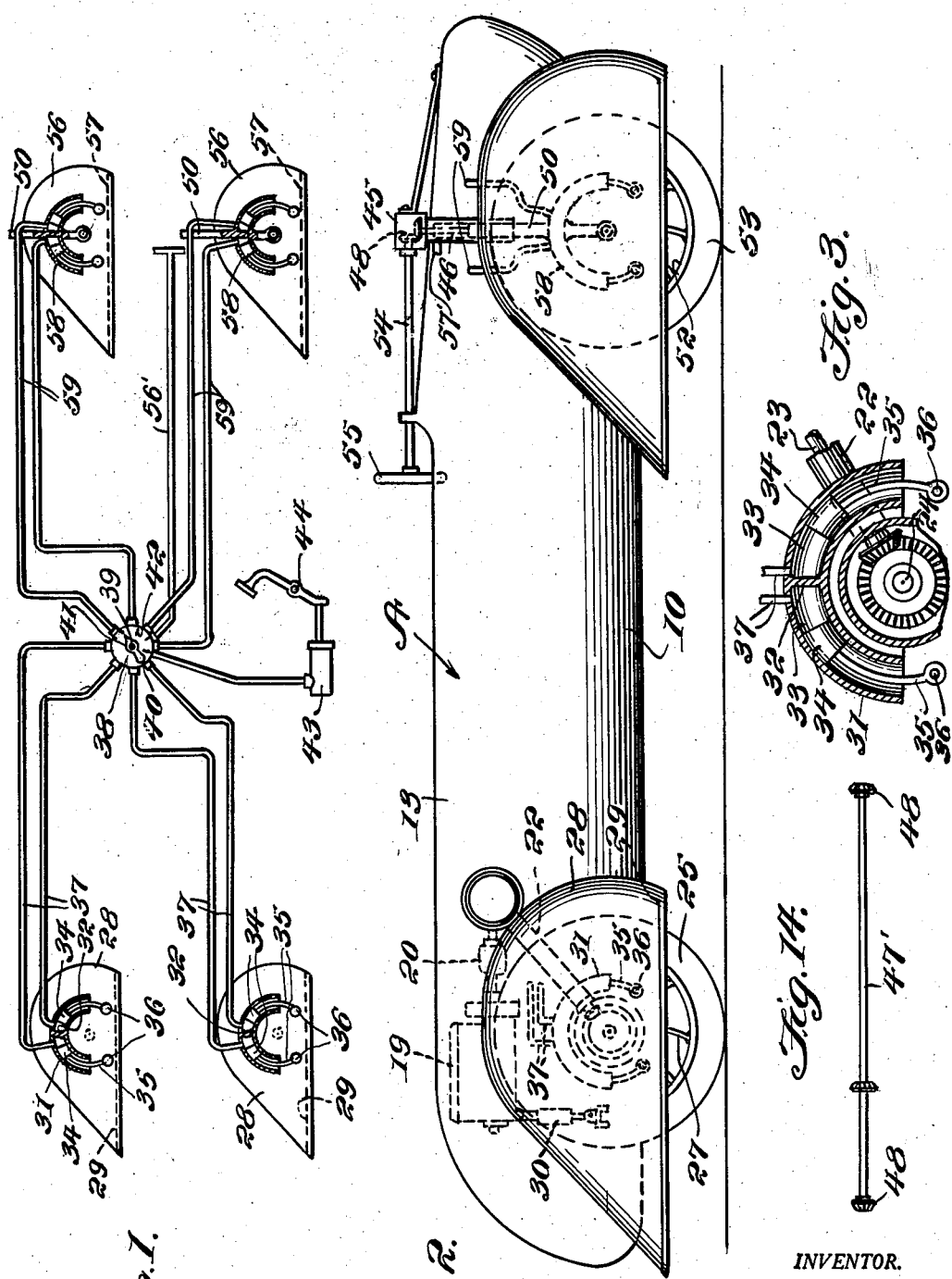

INVENTOR.
J. W. Quinn
BY
Victor J. Evans & Co.
ATTORNEYS

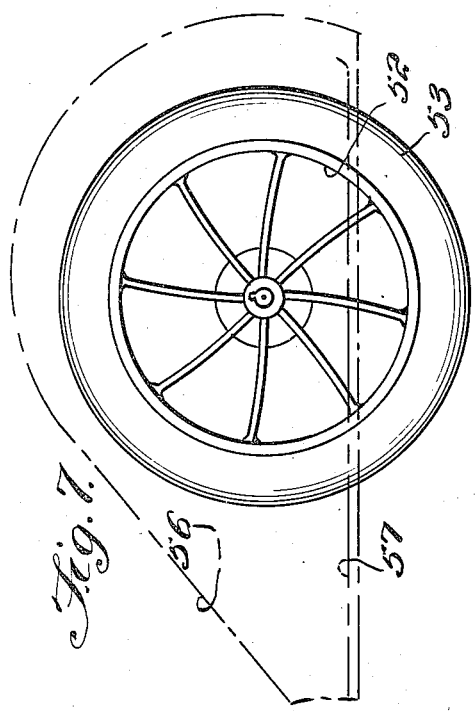
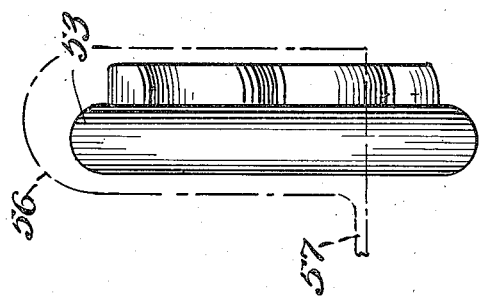
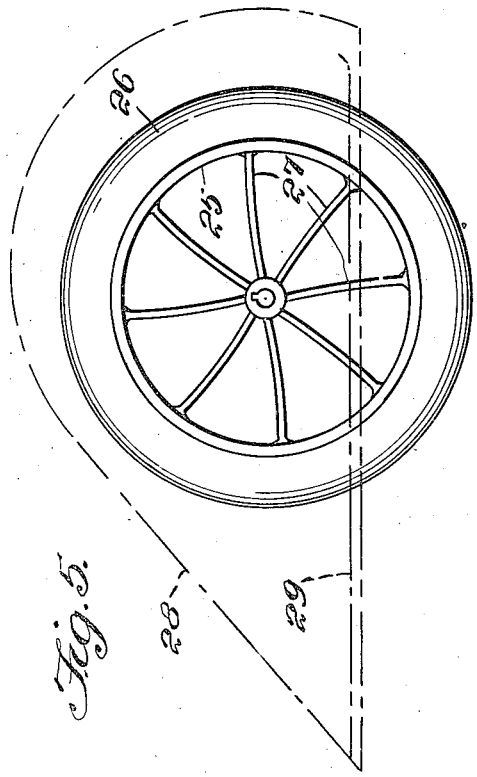
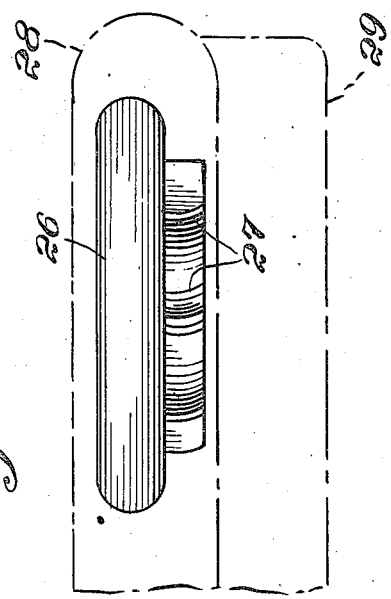

April 23, 1946. J. W. QUINN 2,399,141
WATER AUTOMOBILE
Filed Sept. 13, 1944 4 Sheets-Sheet 4
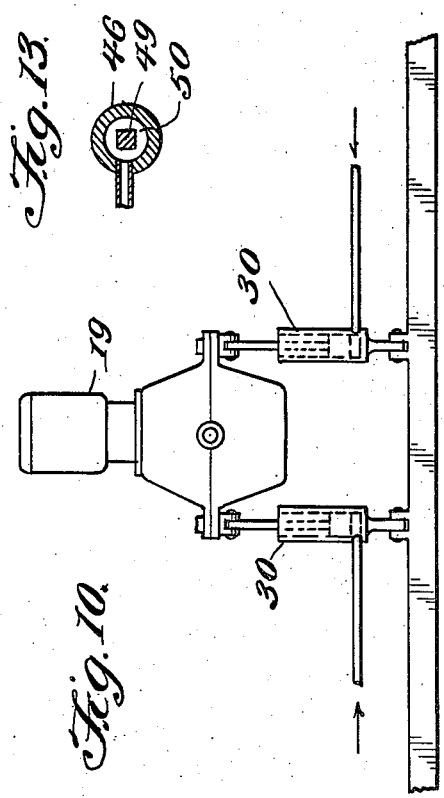
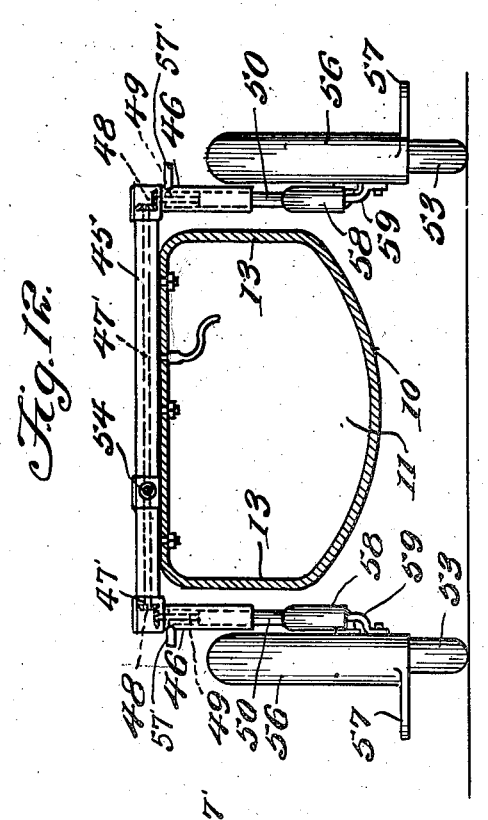
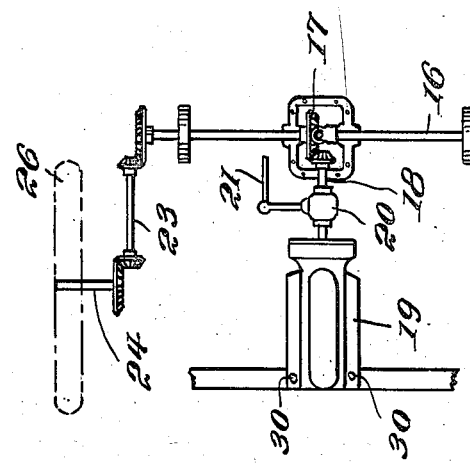
INVENTOR.
J. W. Quinn,
BY
Victor J. Evans & Co.
ATTORNEYS Patented Apr. 23, 1946

2,399,141

UNITED STATES PATENT OFFICE 2,399,141

WATER AUTOMOBILE

Joseph W. Quinn, Santa Monica, Calif.

Application September 13, 1944, Serial No. 553,935

4 Claims. (Cl. 115—1)

The invention relates to a self-propelled vehicle, and more especially to a water and land motor vehicle.

The primary object of the invention is the provision of a vehicle of this character, wherein it is so constructed for travel on land or water, the land travel being alike to an ordinary motor vehicle, and the power wheels of such vehicle are driven from a power motor, while the said vehicle can be steered in a convenient manner when operating on land or water.

Another object of the invention is the provision of a vehicle of this character, wherein the power and steering wheels are adjustable, and such adjustment is effected in a novel and unique manner, both fore and aft of the said vehicle, while all wheels are raised and lowered hydraulically for deep and shallow water action in the advancement of the vehicle in the required direction.

A further object of the invention is the provision of a vehicle of this character, wherein the construction and arrangement thereof is such to give maximum power with a minimum consumption of fuel, in the operation thereof.

A still further object of the invention is the provision of a vehicle of this character, wherein the control thereof can be carried out by a single operator, the vehicle being possessed of a maximum load capacity when traveling on land or water.

A still further object of the invention is the provision of a vehicle of this character, which is simple in construction, thoroughly reliable and efficient in operation, strong, durable, readily and easily controlled, susceptible of absorbing shocks and jars, and inexpensive to manufacture.

With these and other objects in view, the invention consists in the features of construction, combination and arrangement of parts as will be hereinafter more fully described, illustrated in the accompanying drawings, which show the preferred embodiment of the invention, and pointed out in the claims hereunto appended.

In the accompanying drawings—

Figure 1 is a diagrammatic plan view of the hydraulic control system forming a part of the vehicle constructed in accordance with the invention.

Figure 2 is a side view of the vehicle constructed in accordance with the invention.

Figure 3 is a vertical sectional view taken on the line 3—3 of Figure 4.

Figure 5 is a side elevation of one rear power wheel of the vehicle.

Figure 6 is a top plan view thereof.

Figure 7 is a view similar to Figure 5 showing one front wheel of the vehicle.

Figure 8 is a front elevation thereof.

Figure 9 is a detail plan view of the power wheels driving connections with the power motor of the vehicle.

Figure 10 is a fragmentary end elevation of the motor with the combined shock absorbers and hydraulic jacks associated therewith.

Figure 11 is a part sectional view taken on the line 11—11 of Figure 4.

Figure 12 is a sectional view taken on the line 12—12 of Figure 4 looking in the direction of the arrows.

Figure 13 is a sectional view taken on the line 13—13 of Figure 11 looking in the direction of the arrows.

Figure 14 is a plan view of the main steering shaft.

Similar reference characters indicate corresponding parts throughout the several views in the drawings.

Figure 4:
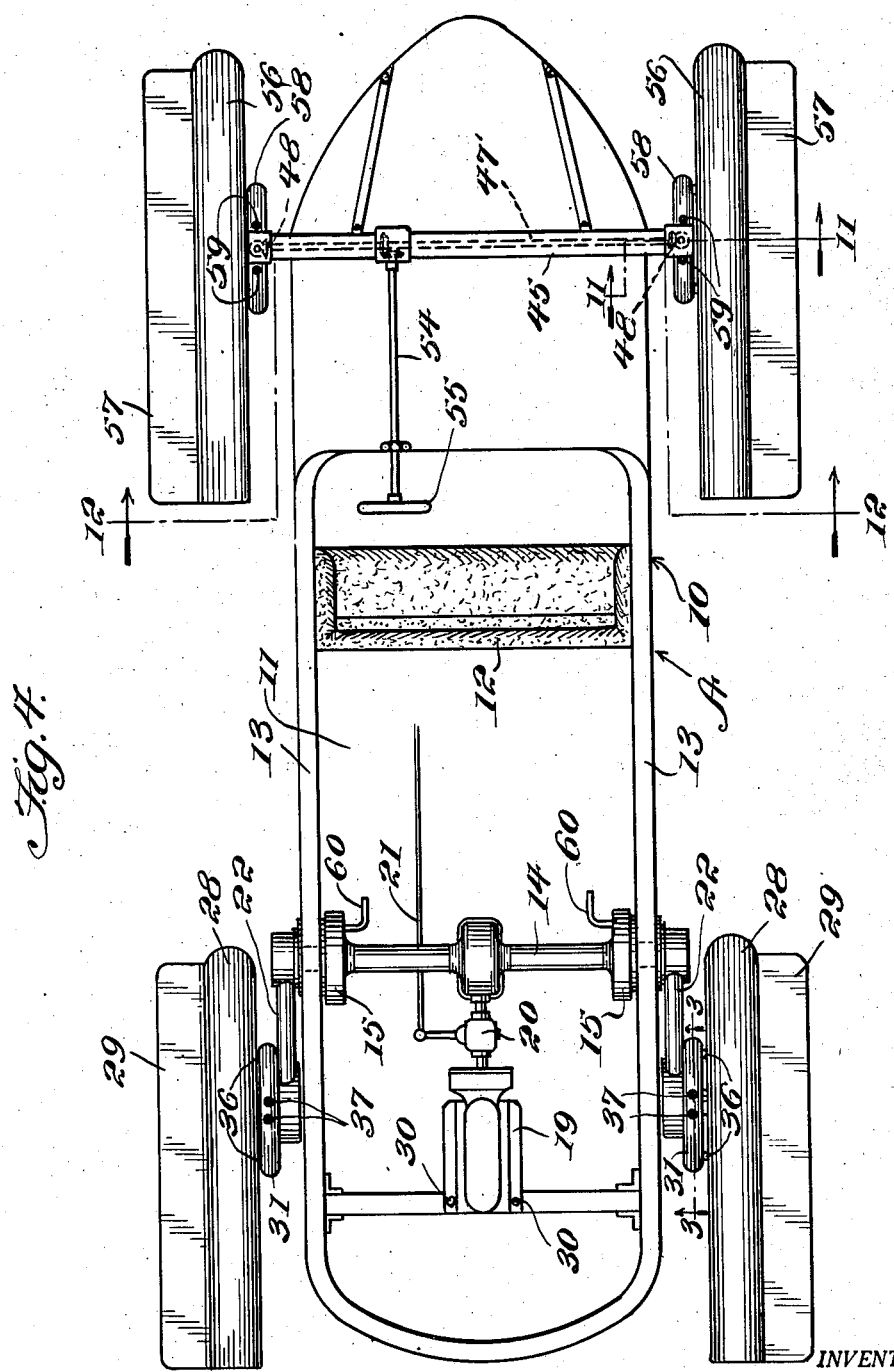
Figure 4 is a top plan view of the vehicle.

Referring to the drawings in detail, A designates generally the vehicle in its entirety as constructed in accordance with the invention, and such vehicle comprises a boat hull-like body 10, which is rendered water-tight in any suitable or well known manner, so that it may float when on water. The interior 11 of the body may be constructed in any desirable manner for loading purposes and transportation thereof. In this instance, the interior 11 is equipped with an operator's seat 12 of any selected style, which is fore of the body 10.

Arranged aft of the body 10 and appropriately fitted in opposite sides 13 thereof is a turnable differential housing 14, carrying inboard of the body brake drums 15, which are located next to the sides 13, while interiorly of the housing are rotatable driving shafts 16, in association with a differential mechanism 17, housing encased, and geared with a power shaft 18 of a power motor 19, the power shaft being in association with a release clutch mechanism 20, operated by hand from a control rod 21 extending into convenient reach of the operator's seat 12 for manual operation.

Exteriorly of the body 10 next to its sides 13 and turnable with the housing 14 are vertically swingable tubular hangers 22 in which are fitted driven connections 23 between the driving shafts 16 and the rear wheel axles 24, to which are fixed the rear power wheels 25, each carrying a pneumatic tire 26, and paddle wheel spokes 27, respectively. Overhanging each wheel 25 and supported for vertical turning movement is a fender or guard 28, having the out-turned bottom outer edge feathering board 29 throughout the longitudinal extent thereof, and this board constitutes an elevator plane, when the vehicle A is afloat to raise and lower the same on the water surface on traveling thereon.

The rearmost end portion of the motor 19 is supported on a pair of vertically disposed hydraulic jacks 30, which serve to lift the said motor and in this manner the hangers 22 are swingable to raise the wheels 25, which also thereby are lowered into the water for the desired propulsive action therein by its paddle wheel spokes 27, when afloat on the water, the tire wheels 25 being for land travel.

The fenders or guards 28 each has fixed thereto a semi-circular cylinder 31 which is divided by a partition 32 into opposed piston chambers 33, having therein pistons 34, the stems 35, which are curved accordingly to the cylinder, are connected by pins 36 to the fender or guard 28, at opposite sides of the turning axis thereof on the axle 24 common thereto, and these pistons are actuated by fluid pressure admitted to the chambers 33 through feed pipes 37 which communicate with a control valve casing 38, fitted with a multiple ported plug type rotary valve, not shown, its stem 39 being fitted with a turning lever 40, which is provided with an indicator tip 41 coacting with a scale marking 42 on the casing to determine the setting of the valve for controlling the direction of flow of the fluid pressure. This casing is in communication with a master cylinder 43, having therein a fluid actuator manually operated by a foot pedal 44 of the hydraulic system installed within the vehicle A.

At the fore portion of the body 10 and bridging the latter is a transversely disposed tubular front steering shaft housing 45, which has the end depending columns 46, in which are fitted tubular steering posts 47, slidably engaged in said columns 46, while within the housing 45 is a rotatable steering shaft 47', geared at 48 to extensible couplings 49 joined with the hangers 50 for front axles 51 supporting front wheels 52, carrying pneumatic tires 53. Fluid under pressure from pipe 56' having connection with the columns 46 at 57' exert pressure on the steering posts 47 to raise the wheels 52 in the same manner as the jacks 30 lift the motor. Pipe 56' is connected to the casing 38 and the pressure thereto is regulated by the valve therein. The steering shaft 47' is actuated by a steering standard 54 having a hand operated steering wheel 55 in convenient reach of the operator when occupying the seat 12 within the body 10. In this manner, the vehicle A is steered when traveling on land or water.

The front wheels 52 have overhanging the same the vertically turnable fenders or guards 56 which are rigidly carried by the cylinders 58, which in turn are carried by the hangers 50. Each fender has an out-turned bottom outer edge feathering board 57 throughout its length and this board serves as an elevator plane similar to the boards 29, and such fenders or guards are equipped with the cylinders 58, having the pistons therein identical to the pistons 34 and which have their stems attached to the fenders or guards similar to the latter, the fenders or guards being turned by fluid pressure from pipes 59 leading from the casing 38, and this pressure is regulated by the valve therein.

Brake mechanism not shown installed with the brake drums 15 is controlled hydraulically by fluid pressure from pipes 60, and such mechanism is manually controlled in any selected manner for regulating the speed travel of the vehicles A.

In the operation of the vehicle A, it is susceptible of travel on land, in a manner similar to the ordinary motor vehicle, and also will travel on water, the pedal wheel spokes 27 propelling such vehicle and the wheels 25 are driven by power from the motor 19. The front and rear wheels 52 and 25, respectively, are selectively raised and lowered in a manner as before explained, thereby bringing such wheels into proper position so that they may be deep in the water or close to the surface thereof, as may be required for the successful working of the vehicle A.

The fenders or guards overhanging the wheels may be turned to raise or lower the body of the vehicle A when traveling in the water, while the speed of travel thereof is regulated by the brake mechanism before referred to.

What is claimed is:

1. A vehicle of the kind described, comprising a water-tight body, vertically adjustable wheels fore and aft of the body, paddle wheel spokes on the aft wheels, power means for driving the aft wheels, hydraulic means for vertically adjusting the fore and aft wheels, means for controlling the hydraulic means, fenders covering the upper portions of the wheels and spokes and feathering boards at the outer lowermost portions of the fenders.

2. A vehicle of the kind described, comprising a water-tight body, vertically adjustable wheels fore and aft of the body, paddle wheel spokes on the aft wheels, power means for driving the aft wheels, hydraulic means for vertically adjusting the fore and aft wheels, means for controlling the hydraulic means, rotatably mounted fenders covering the upper portions of the wheels and spokes, feathering boards at the outer lowermost portions of the fenders and means for turning the fenders vertically and controlled by the hydraulic means.

3. A vehicle of the kind described, comprising a water-tight body, vertically adjustable wheels fore and aft of the body, paddle wheel spokes on the aft wheels, power means for driving the aft wheels, hydraulic means for vertically adjusting the fore and aft wheels, means for controlling the hydraulic means, rotatably mounted fenders covering the upper portions of the wheels and spokes, feathering boards at the outer lowermost portions of the fenders, means for turning the fenders vertically and controlled by the hydraulic means and manually controlled means for steering the fore wheels.

4. A vehicle of the kind described, comprising a water-tight body, vertically adjustable fore and aft wheels on said body, supporting members for the front wheels, paddle wheel spokes on the aft wheels, power means for driving the aft wheels, fenders covering the upper portions of the aft wheels and spokes, and steering fenders carried by the front wheel supporting members and movable vertically and horizontally therewith.

JOSEPH W. QUINN.